US012764334B2

(12) United States Patent
Merchant et al.

(10) Patent No.: US 12,764,334 B2
(45) Date of Patent: Oct. 13, 2026

(54) SECURELY ENCODING AUTHENTICITY TOKENS INTO ARTIFICIAL INTELLIGENCE (AI) GENERATED CONTENT

(71) Applicant: Microsoft Technology Licensing, LLC, Redmond, WA (US)

(72) Inventors: Meenaz Aliraza Merchant, Kirkland, WA (US); Bichong Li, Beijing (CN); Yue Yu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 295 days.

(21) Appl. No.: 18/734,940

(22) Filed: Jun. 5, 2024

(65) Prior Publication Data

US 2025/0380005 A1 Dec. 11, 2025

(51) Int. Cl.

| | |
|---|---|
| ***H04N 19/625*** | (2014.01) |
| ***H04N 19/184*** | (2014.01) |
| ***H04N 19/63*** | (2014.01) |

(52) U.S. Cl.

CPC ......... *H04N 19/625* (2014.11); *H04N 19/184* (2014.11); *H04N 19/63* (2014.11)

(58) Field of Classification Search

CPC ..... H04N 19/625; H04N 19/63; H04N 19/184

See application file for complete search history.

(56) References Cited

U.S. PATENT DOCUMENTS

| | | | | |
|---|---|---|---|---|
| 9,538,178 B2 * | 1/2017 | Song | .................... | H04N 19/50 |
| 11,172,093 B2 * | 11/2021 | Arana | .............. | H04N 21/26291 |
| 11,265,544 B2 * | 3/2022 | Sarwer | ................. | H04N 19/625 |

FOREIGN PATENT DOCUMENTS

| | | | | |
|---|---|---|---|---|
| CN | 117114955 A * | 11/2023 | ........... | G06T 1/0021 |

OTHER PUBLICATIONS

"Understanding the source of what we see and hear online," retrieve from: https://openai.com/index/understanding-the-source-of-what-we-see-and-hear-online/, May 7, 2024, 9pages.

Jaiman, Ashish, "Disinformation Is a Cybersecurity Threat," retrieve from: https://medium.com/swlh/disinformation-is-a-cybersecurity-threat-335681b15b48, Jan. 30, 2021, 15 pages.

* cited by examiner

*Primary Examiner* — Boubacar Abdou Tchoussou

(74) *Attorney, Agent, or Firm* — Ray Quinney & Nebeker P.C.; Christopher K. Hallstrom

(57) ABSTRACT

This disclosure describes utilizing an image encoding system that provides a comprehensive and robust defense strategy for artificial intelligence (AI) generated content (AIGC). Specifically, the image encoding system provides a framework that combines multiple security measures with various transform domain methods in order to encode an image with multiple instances of an encoded image identifier. The image encoding system achieves a balance between maintaining the high quality of generative images and ensuring the traceability of the images. By doing so, the image encoding system addresses numerous technical challenges presented by AI-generated media, thereby ensuring that generative images are protected against unauthorized usage.

20 Claims, 9 Drawing Sheets

SECURELY ENCODING AUTHENTICITY TOKENS INTO ARTIFICIAL INTELLIGENCE (AI) GENERATED CONTENT

BACKGROUND

Recent years have witnessed significant advancements in both the hardware and software domains, particularly in generative artificial intelligence (AI) models and the use of generative AI models to generate digital images. For instance, generative digital images are being widely integrated into numerous systems and applications. Additionally, some existing systems apply watermarks or steganography to digital images to track their origins. However, these protective measures are frequently circumvented by malicious entities who target these images, remove the embedded identifiers to evade origin tracking, and often repurpose the images for unauthorized uses, such as creating deepfakes or spreading disinformation.

BRIEF DESCRIPTION OF THE DRAWINGS

The following detailed description provides specific and detailed implementations accompanied by drawings. Additionally, each of the figures listed below corresponds to one or more implementations discussed in this disclosure.

DETAILED DESCRIPTION

Figure 1:
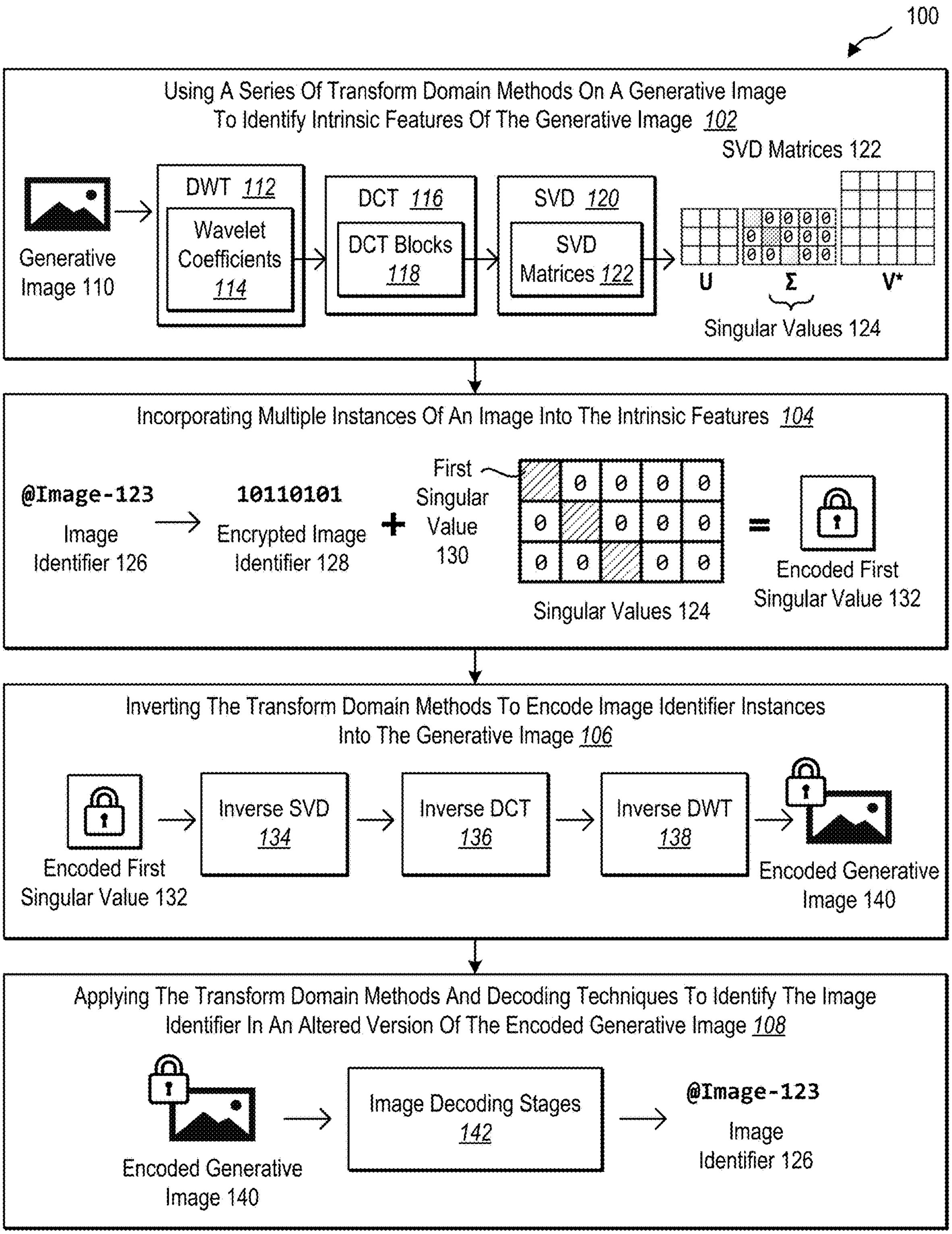
FIG. 1 illustrates an example overview of the image encoding system encoding protective measures within generative images to securely and accurately trace their origins.

This disclosure describes utilizing an image encoding system that provides a comprehensive and robust defense strategy for artificial intelligence (AI) generated content (AIGC). Specifically, the image encoding system provides a framework that combines multiple security measures with various transform domain methods in order to encode an image with multiple instances of an encoded image identifier. The image encoding system achieves a balance between maintaining the high quality of generative images and ensuring the traceability of the images. By doing so, the image encoding system addresses numerous technical challenges presented by AI-generated media, thereby ensuring that generative images are protected against unauthorized usage.

Implementations of the present disclosure provide benefits and solve problems in the art with systems, computer-readable media, and computer-implemented methods that utilize an image encoding system. The image encoding system implements improved protective security measures with generative images to ensure traceability of their creation origins, including the prompt and user identifier that requested the image creation. As described below, the image encoding system embeds and encodes image identifiers (e.g., a unique label or tag associated with a generative image that indicates origin information) into generative images using multiple security measures and various transform domain methods without degrading the image quality of a generative image.

To elaborate, in various implementations, the image encoding system encodes authenticity tokens into AI generative content. For example, the image encoding system generates discrete cosine transform (DCT) blocks for a generative image based on using discrete wavelet transform (DWT) and DCT. In addition, the image encoding system generates a set of singular values for each DCT block using singular value decomposition (SVD). Additionally, in one or more implementations, the image encoding system encodes a bit (e.g., a binary digit of 0 or 1) of an image identifier (e.g., an indicator linking to origin information about the generative image) into a first singular value of the set of singular values. In various instances, the image encoding system generates an encoded generative image based on applying an inverse SVD, an inverse DCT, and an inverse DWT to the set of singular values having an encoded singular value.

In some implementations, the image encoding system generates DCT blocks for a generative image based on using the discrete wavelet transform (DWT) and DCT, as well as generates a set of singular values for each of the DCT blocks using SVD. In additional implementations, the image encoding system encodes single bits of an encrypted image identifier into the first singular value of each set of singular values associated with each of the DCT blocks, and generates an encoded generative image based on applying an inverse SVD, inverse DCT, and inverse DWT to each of the first set of singular values with an encoded first singular value.

In one or more implementations, the image encoding system also includes decoding a version of the encoded generative image (e.g., a copied, modified, or altered version). For example, the image encoding system extracts multiple instances of a bit sequence from the encoded generative image. In addition, the image encoding system generates a combined bit sequence from the multiple instances of the bit sequence. Furthermore, in various implementations, the image encoding system decrypts the combined bit sequence to identify an image identifier.

As described in this disclosure, the image encoding system delivers several significant technical benefits in terms of improved computing security, accuracy, and efficiency compared to existing systems that utilize generative AI image models. Moreover, the image encoding system provides several practical applications that address problems related to encoding and detecting image origination identifiers in generative images, even if the images have been altered or modified.

To elaborate, the image encoding system provides improved security over existing systems by encoding an image identifier into a generative image at the time of image creation. In particular, the image encoding system securely embeds an encoded image deep within elements of the image in a way that provides little to no image quality degradation. In various implementations, the image encoding system utilizes multiple transform domain methods to identify sets of discrete blocks with elements deep within the image data. Furthermore, the image encoding system can encode a coded image identifier bit into a single element of each set of discrete blocks to add the image identifier to the generative image with little to no negative effect on the image quality.

In various implementations, the image encoding system utilizes various security measures to enhance the security of the generative image further (e.g., to provide improved accuracy over existing systems). For example, in some implementations, the image encoding system utilizes a shuffling element with a randomized shuffle pattern at an intermediary step of the transform domain methods to further guard the image identifier against bad actors seeking to remove or modify the identifier. As another example, the image encoding system encodes multiple instances of the encoded image identifier into a generative image, making it difficult to remove the image identifier as each instance needs to be removed. In another example, the image encoding system utilizes selective encoding to determine whether to add a bit from the coded image identifier, confusing bad actors trying to recover the image identifier that appears incomplete or incorrect.

In one or more implementations, the image encoding system provides improved accuracy over existing systems by using an image quality model to determine when to skip encoding one or more bits from the coded image identifier into a generative image. For example, the image quality model determines when a set of discrete blocks with a single encoded element will cause an obvious image quality flaw and, if so, skips encoding the bit. Additionally, the image encoding system utilizes multiple instances of the encoded image identifier and a customized threshold model to determine the coded image identifier from one or more versions of the coded image identifier within the generative image. The image encoding system can then decrypt the coded image identifier to retrieve the image identifier from the generative image.

As another example, using the image identifier, the image encoding system can identify the user identifier and the prompt that was used to generate the generative image and take appropriate action. For example, the image encoding system can link a generative image to the generative AI model and user identifier from which it was generated using the image identifier even if the image has been modified. Indeed, encoding an image identifier multiple times into a generative image, coupled with intelligent decoding methods, can ensure that the image identifier is still recoverable and traceable even if the generative image has been altered.

Additionally, the image encoding system provides improved efficiency over existing systems. In particular, the image encoding system utilizes a multi-layered defense strategy to effectively counteract these threats and harms. The transform domain methods used by the image encoding system facilitate efficient processing of a generative image. Furthermore, the additional security measures allow the image encoding system to efficiently and selectively encode image identifiers into generative images.

Moreover, the image encoding system provides improved flexibility over existing systems. For example, the image encoding system encodes generative images after they are generated. This allows the image encoding system to be used with a variety of generative AI image models. Furthermore, because the encoding security measures are not tied to model generation, the image encoding system allows the user identifier that generated the prompt to be identified rather than merely indicating the generative model that generated the image.

As illustrated in the foregoing discussion, this disclosure utilizes a variety of terms to describe the features and advantages of one or more implementations described. To illustrate, this disclosure describes the image encoding system in the context of a cloud computing system. As an example, the term "cloud computing system" refers to a network of interconnected computing devices that provide various services and applications to computing devices (e.g., server devices and client devices) inside or outside of the cloud computing system As an example, the term "generative artificial intelligence model" (or "generative AI model") refers to an artificial intelligence computational system that utilizes deep learning and a large number of parameters (e.g., in the billions or trillions for a large version and fewer for a small version) that are trained on one or more extensive datasets to produce coherent, contextually relevant, and fluent topic-specific outputs (e.g., text and/or images). In many instances, a generative AI model refers to an advanced computational system that uses natural language processing, machine learning, and/or image processing to generate coherent and contextually relevant human-like responses. For example, a generative AI image model is a generative AI model that specializes in creating generative images Generative AI models have applications in natural language understanding, content generation, text summarization, dialogue systems, language translation, creative writing assistance, image generation, audio generation, and more. A single generative AI model often performs a wide range of tasks by receiving different inputs, such as prompts (e.g., input instructions, rules, example inputs, example outputs, and/or tasks), data, and/or access to data. In response, the generative AI model generates various output formats ranging from one-word answers to long narratives, images and videos, labeled datasets, documents, tables, and presentations.

Moreover, generative AI models are primarily based on transformer architectures for understanding, generating, and manipulating human language. Generative AI models can also utilize other types of architectures such as recurrent neural network (RNN) architecture, long short-term memory (LSTM) model architecture, convolutional neural network (CNN) architecture, or other types of architectures. Examples of generative AI models include generative pre-trained transformer (GPT) models like GPT-3.5, GPT-4 and GPT-4o, bidirectional encoder representations from transformers (BERT) models, text-to-text transfer transformer models like T5, conditional transformer language (CTRL) models, and Turing-NLG. Other types of generative AI models include sequence-to-sequence models (Seq2Seq), vanilla RNNs, and LSTM networks. In some instances, a generative AI model includes a large language model (LLM), a small language model (SLM) n and a small action model (SAM), which serves as a text-based version of a generative AI model, such as one that receives text prompts and/or generates text outputs. In various implementations, a generative AI model is a multimodal generative model that receives multiple input formats (e.g., text, images, video, data structures) and/or generates multiple output formats.

As another example, the terms "prompt," "model prompt," or "generative AI model prompt" refer to a request provided to a large generative image model to create generative AI model output based on plain language guidance prompts. In various instances, the prompt is an image prompt requesting the creation of a generative image with content associated with the prompt.

As an example, the term "generative image" refers to an image generated by a generative AI model such as a generative AI image model based on an image prompt.

As an example, the term "transform domain methods" refers to techniques used in image processing that transform an image into another domain before applying processing procedures to the transformed image. Examples of transform domain methods include Fourier transforms, wavelet transforms, and multi-scale transforms. In various implementations, transform domain methods modulate the magnitude of coefficients in a transform domain of an image to embed information. Specific examples of transform domain methods discussed in this document include discrete cosine transform (DCT), discrete wavelet transform (DWT), and singular value decomposition (SVD), which are further discussed below.

As another example, the term "image identifier" refers to a unique label or tag associated with a generative image that indicates origin information. Origin information can include the specific model used to generate the image, the user identifier and prompt used to request the generative image, the time and location of image generation, and any pre- or post-processing that occurred in connection with the image generation process. In some implementations, the image identifier is a digital signature that verifies the origin and authenticity of the generative image.

Implementation examples and details of the image encoding system are discussed in connection with the accompanying figures, which are described next. For example, FIG. 1 illustrates an example overview of the image encoding system encoding protective measures within generative images to securely and accurately trace their origins according to some implementations. Indeed, FIG. 1 provides high-level details for embedding multiple instances of an image identifier, often hidden to prevent detection, into a generative image to authenticate the generative image. While FIG. 1 provides a high-level overview of the invention, additional details are provided in subsequent figures.

FIG. 1 illustrates a series of acts 100 performed by or with the image encoding system. As shown, the series of acts 100 includes act 102 using a series of transform domain methods on a generative image to identify intrinsic features of the generative image. For example, upon generating an image using a generative AI model (e.g., a generative AI image model), the image encoding system processes the image through a series or chain of transform domain methods to identify elements deep within the image data.

As shown in connection with act 102, the image encoding system identifies a generative image 110 and provides it to a DWT 112 to generate wavelet coefficients 114. The image encoding system can also process each of the wavelet coefficients 114 with a DCT 116 to generate DCT blocks 118. For each of the DCT blocks 118, the image encoding system further generates SVD matrices 122, which include singular values 124, using an SVD 120. The singular values 124 include intrinsic features of the generative image 110 that can be modified to embed data with minimal effect on image quality.

Act 104 includes incorporating multiple instances of an image into the intrinsic features. For example, the singular values include a first singular value 130 indicating an intrinsic feature of the generative image 110. Additionally, at the time the image is generated, the image encoding system generates an image identifier 126. The image encoding system can encode and/or encrypt the image identifier 126 to generate an encrypted image identifier 128 (e.g., a coded image identifier), which may form a sequence of bits.

Furthermore, in various implementations, the image encoding system encodes a single bit from the encrypted image identifier 128 into the first singular value 130 to generate an encoded first singular value 132. In various implementations, the image encoding system repeats the process with additional bits from the encrypted image identifier 128 in different first singular values belonging to other instances of the DCT blocks 118 to generate multiple encoded first singular values instances. In some cases, the image encoding system encodes multiple instances of the bit sequence of the encrypted image identifier 128, one by one, across most or all of the DCT blocks 118 of the generative image 110.

Act 106 includes inverting the transform domain methods to encode image identifier instances into the generative image. For example, for the first singular value 130 and the other encoded first elements of the other DCT blocks, the image encoding system applies an inverse SVD 134, an inverse DCT 136, and an inverse DWT 138 to generate an encoded generative image 140. In some implementations, the image encoding system encodes over 100 instances of the encrypted image identifier 128 into the encoded generative image 140.

As further described in subsequent figures, the image encoding system may apply additional security features and quality assurance measures to add further robustness to the encoded generative image 140. For example, the image encoding system utilizes random pattern shifting to better secure the encoded bit sequence. As another example, the image encoding system uses an image quality model to ensure that encoding the encrypted image identifier 128 does not visually degrade the quality of the generative image 110. These and other features and measures are further described below.

Act 108 includes applying the transform domain methods and decoding techniques to identify the image identifier in an altered version of the encoded generative image. For instance, the encoded generative image 140 may be altered, modified, or used for harmful purposes. In these cases, the image encoding system can detect the image identifier, which reveals which model generated the image, when it was generated, the prompt that caused the image to be generated, and the user identifier of the requesting user. With this information, the image encoding system can authenticate the origins of the generative image. In the case of harmful images, the image encoding system can prevent similar images from being generated in the future.

As shown in act 108, the image encoding system processes the encoded generative image 140, or an altered version, through image decoding stages 142. As discussed further below, the image decoding stages 142 include the transform domain methods, bit sequence extraction, coded bit sequence determination, and decryption stages to identify the image identifier 126 from the encoded generative image 140.

Figure 2:
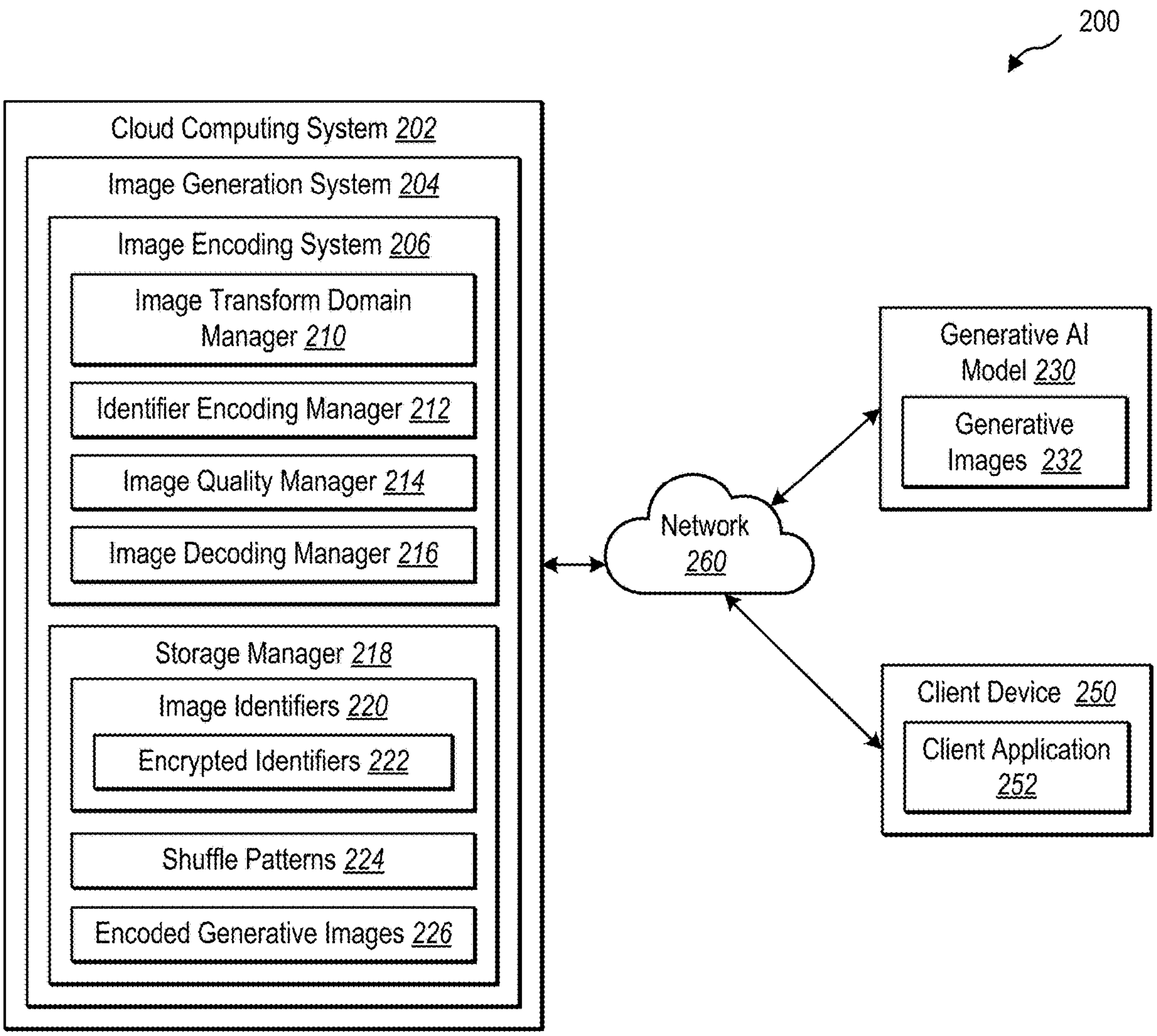
FIG. 2 illustrates an example computing environment where the image encoding system is implemented.

With a general overview in place, additional details are provided regarding the components, features, and elements of the image encoding system. To illustrate, FIG. 2 shows an example computing environment where the image encoding system is implemented according to some implementations. In particular, FIG. 2 illustrates an example of a computing environment 200 of various computing devices associated with an image encoding system 206. While FIG. 2 shows example arrangements and configurations of the computing environment 200, the image encoding system 206, and associated components, other arrangements and configurations are possible.

As shown, the computing environment 200 includes a cloud computing system 202 associated with the image encoding system 206, a generative AI image model 230 with generative images 232, and a client device 250 with a client application 252, connected via a network 260. Many of these components may be implemented on one or more computing devices, such as on one or more server devices. Some of these components may be implemented on a personal device. For example, the generative AI image model 230 is a small generative model located on the client device 250. Further details regarding computing devices are provided below in connection with FIG. 7, along with additional details regarding networks, such as the network 260 shown.

Before describing components of the cloud computing system 202, including the image encoding system 206, other components of the computing environment 200 are first discussed. As shown, the computing environment 200 includes the generative AI image model 230, which creates generative images based on input prompts. For example, the client device 250 provides an image prompt to the image generation system 204, which uses the generative AI image model 230 to create generative images 232. In some implementations, the image prompt causes the generative AI image model 230 to generate a harmful image, circumventing security guardrails of the image generation system 204 and the generative AI image model 230.

As shown, the computing environment 200 includes the client device 250. In various implementations, the client device 250 is associated with a user (e.g., a user client device), such as a user who uses a generative AI image model 230 via the cloud computing system 202 to create generative images. For example, the client device 250 includes a client application 252, such as a web browser, mobile application, or another form of computer application for accessing and/or interacting with the cloud computing system 202 and/or generative AI image model 230.

Returning to the cloud computing system 202, as shown, the cloud computing system 202 includes an image generation system 204, which provides users with generative images. In various implementations, the image generation system 204 uses the generative AI image model 230 to create generative images 232. For example, the image generation system 204 passes user prompts (with or without modifications) to the generative AI image model 230 and returns the generative images to requesting user devices (e.g., the client device 250).

As shown, the image generation system 204 implements the image encoding system 206. In some implementations, the image encoding system 206 is located on a separate computing device from the image generation system 204 within the cloud computing system 202 (or apart from the cloud computing system 202). In various implementations, the image generation system 204 operates without the image encoding system 206.

As mentioned earlier, the image encoding system 206 provides a comprehensive and robust defense strategy for AIGC. As shown, the image encoding system 206 includes various components and elements, which are implemented in hardware and/or software. For example, the image encoding system 206 includes an image transform domain manager 210, an identifier encoding manager 212, an image quality manager 214, a model decoding manager 216, and a storage manager 218. The storage manager 218 includes image identifiers 220, encrypted identifiers 222, shuffle patterns 224, and encoded generative images 226.

As mentioned above, the image encoding system 206 includes various components that may perform a variety of functions. For example, the image transform domain manager 210 performs various actions and functions in connection with transform domain methods, such as DWT, DCT, and SVD, to add layers of security and identify intrinsic features and elements of a generative image, as further described below. The identifier encoding manager 212 encodes image identifiers 220 and/or encrypted identifiers 222 into intrinsic features and elements, as described below. In some implementations, the identifier encoding manager 212 also applies shuffle patterns 224 to add an additional layer of security to encode the generative images 232.

As further examples, in various implementations, the image quality manager 214 determines when to selectively encode bits from an encrypted identifier into a generative image to ensure that the encoded generative images 226 have few or no obvious visual flaws. In one or more implementations, the model decoding manager 216 decodes encoded generative images 226 to extract and identify image identifiers 220 encoded within the image, enabling the image encoding system 206 to accurately and efficiently trace the origin of encoded generative images 226. Additional details regarding the functions and operations of the image encoding system 206 are described below in the subsequent figures.

Figure 3A:
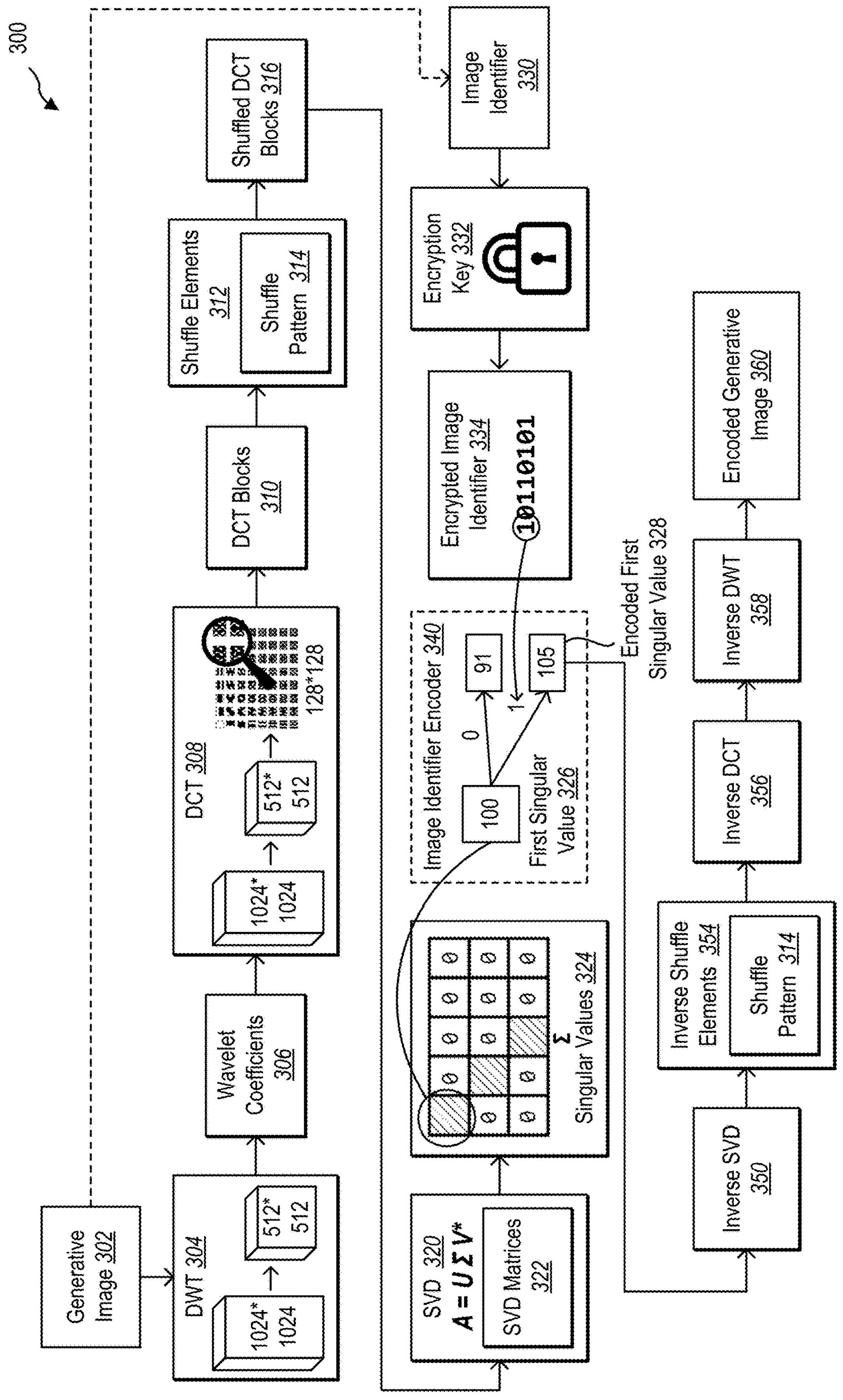
FIGS. 3A-3B illustrate example diagrams of encoding an image identifier into a generative image including shuffling elements during the encoding process.
Figure 3B:
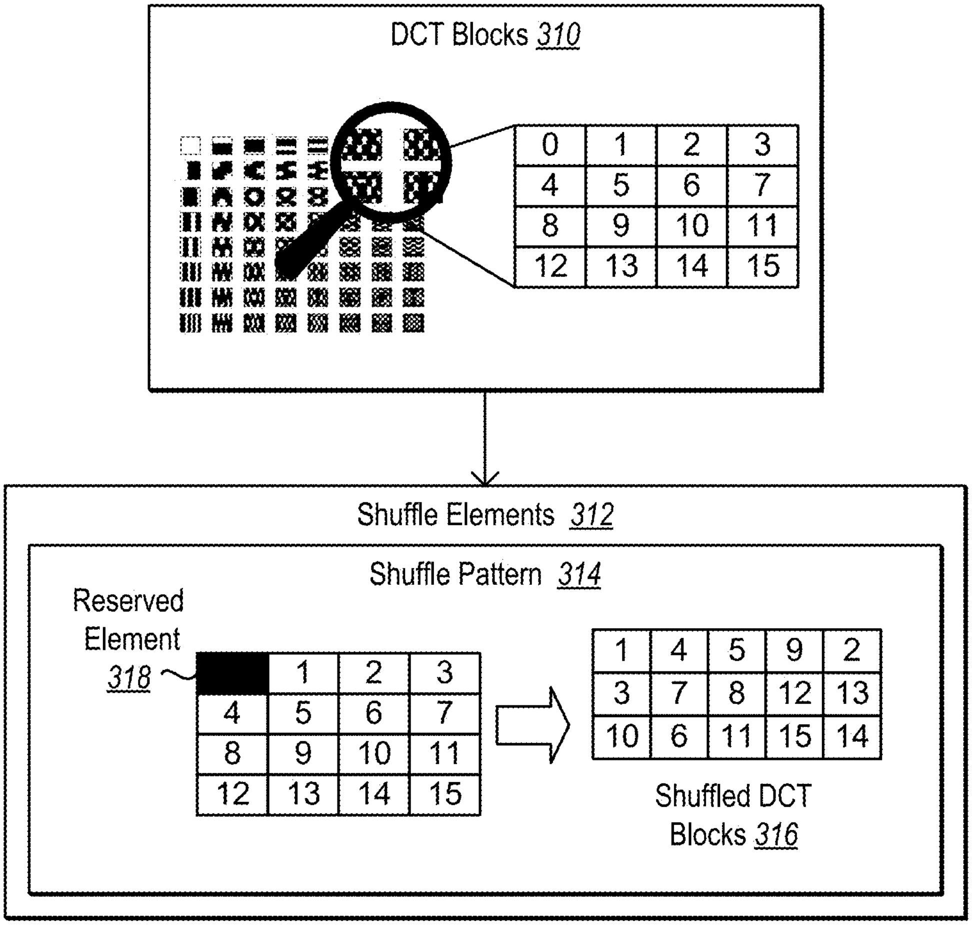

FIGS. 3A-3B illustrate example diagrams of encoding an image identifier into a generative image, including shuffling elements during the encoding process according to some embodiments. As shown, FIG. 3A includes an image encoding process 300 for the image encoding system 206 encoding a generative image with a coded image identifier. In various implementations, the image encoding system 206 encodes the image identifier by hiding it once or several times within the generative image without affecting the visual image quality of the image.

As shown, the process in FIG. 3A starts with a generative image 302. For example, a generative AI image model generates the generative image 302 in response to a user image prompt. In some implementations, the image encoding system 206 facilitates the generative AI image model generating and providing the generative image 302 to a client device associated with a user.

Additionally, in some implementations, the image encoding system 206 may also generate and/or assign an image identifier 330 to the generative image 302. For example, the image identifier 330 includes data or metadata associated with the image creation such as the model version of the generative AI image model, the time, the input prompt, the user identifier, and/or the frontend application.

One goal of the image encoding system 206 is to securely embed the image identifier 330 within the generative image 302 as a token authenticating the origin of the image. In some instances, the image encoding system 206 hides or obscures the image identifier 330 within the generative image as an added layer of security against actors that would remove the identifier. Because the image encoding system 206 pairs the image identifier 330 with the image upon its creation, the image encoding system 206 can apply a similarly robust and secure process to any digital image, regardless of how the image is generated (e.g., by a user, computer, or model).

As shown, the image encoding system 206 provides the generative image 302 to a set of transform domain methods, including a DWT 304, a DCT 308, and SVD 320, to break down the generative image 302 to identify intrinsic elements and features. By identifying intrinsic features, the image encoding system 206 can encode the image identifier 330 with little to no visual interference of the image.

For context, information about the transform domain methods is now provided. Regarding the discrete wavelet transform or DWT, this transformation includes dividing a one-dimensional signal of an image into two parts: a high-frequency part and a low-frequency part. The high-frequency part of the signal provides information about the edge components of the signal (e.g., the finer details of the signal), while the low-frequency part includes the main features of the signal. Accordingly, the DWT process includes further splitting the low-frequency part into the two parts. This process continues until the desired level of decomposition is reached.

In each level of DWT decomposition, an image is divided into four parts: first, an approximation image that represents the low-frequency components; second, horizontal detail components; third, vertical detail components; and fourth, diagonal detail components. Often in DWT decomposition, the length of the input signal is a multiple of $2^n$, where n represents the number of decomposition levels.

In many cases, DWT efficiently analyzes and reconstructs the original signal of an image to obtain sufficient image information with little computational resources. Indeed, DWT simplifies complex signals by breaking them down into manageable components for analysis or processing tasks, including watermarking and steganography.

Regarding the discrete cosine transform or DCT, this transformation expresses a finite sequence of data points in terms of a sum of cosine functions oscillating at different frequencies. In some cases, DCT transforms an image from the spatial domain (e.g., the actual image) to the frequency domain (e.g., a representation of the image in terms of frequencies) where high-frequency components (e.g., the fine details) can be altered to embed data without significantly affecting the visual quality of the image, as the human eye is less sensitive to changes in high-frequency components.

Singular value decomposition or SVD is another process used to extract meaningful information from complex data sets or signals. For example, SVD is a method that breaks down an original matrix A into three separate matrices, U, Σ (Sigma), and $V^T$. The U matrix is a left singular matrix and is orthogonal. The columns of the U matrix are called the left singular vectors. The $V^T$ matrix is the transpose of the right singular matrix (V). The V matrix is also an orthogonal matrix and its columns are called the right singular vectors.

The Σ matrix is a diagonal matrix, which means that all its non-diagonal elements are zero. The diagonal elements are known as the singular values (e.g., a set of singular values) and are non-negative. These singular values are commonly arranged in descending order from top left to bottom right. Singular values represent the "strength" or "magnitude" of the corresponding singular vectors and capture the core characteristics of the original matrix.

Returning to FIG. 3A, the image encoding system 206 provides the generative image 302 to the DWT 304 to generate wavelet coefficients 306 for the image. In some implementations, the image encoding system only provides a portion of the image to the DWT 304. For example, the image encoding system 206 sends a brightness component (e.g., Y in YUV color space or a component from the RGB space) or another component to the DWT 304. Furthermore, in some implementations, the image encoding system shapes the generative image 302 into a square image (e.g., 1024×1024 pixels), and the DWT 304 reduces the image size (e.g., from 1024×1024 pixels to 512×512 pixels).

The image encoding system 206 then provides the wavelet coefficients 306 to the DCT 308 to generate and partition DCT blocks 310. In various implementations, the DCT blocks 310 are sized at four elements by four elements (e.g., each element includes 4 pixels). In some implementations, the DCT blocks 310 are sized differently (e.g., 8×8 or 32×32). For example, using DCT blocks sized at 4×4 elements, the image encoding system 206 generates 128×128 DCT blocks from the wavelet coefficients 306 of the image. If using a larger size of elements or pixels per block, the image encoding system 206 generates fewer DCT blocks for an image.

As shown, the image encoding process 300 includes the image encoding system 206 applying shuffle elements 312 to the DCT blocks 310 to generate shuffled DCT blocks 316 in new configurations. In particular, the image encoding system 206 applies a shuffle pattern 314 to each of the DCT blocks 310 to rearrange the elements in the blocks and add another layer of security. Additional details about the shuffle elements 312 are provided below in FIG. 3B.

For one, many, or all of the shuffled DCT blocks 316, the image encoding system 206 utilizes the SVD 320 to generate SVD matrices 322, which include a diagonal matrix with singular values 324, as described above. As shown, the diagonal matrix (e.g., the Σ (Sigma) matrix) includes multiple singular values, including a first singular value 326. While the top left element of the diagonal matrix is shown as the first singular value 326, the first singular value 326 may be any of the diagonal elements. In various implementations, the image encoding system 206 identifies a first singular value to ensure that it does not become lost during image compression or another process that removes less significant features of the image.

With the generative image 302 broken down into intrinsic elements and features, the image encoding system 206 can begin to encode the image identifier 330 into the image. As shown, the image encoding system 206 encrypts the image identifier 330 with an encryption key 332 (e.g., a private security key). In some implementations, the image encoding system 206 skips this process; however, encrypting the image identifier 330 adds another layer of security to the image encoding process 300.

As shown, the image encoding system 206 generates an encrypted image identifier 334 (e.g., a coded image identifier) from the image identifier 330 using an encryption algorithm based on the encryption key 332. In various implementations, the encrypted image identifier 334 is a 120-bit sequence. The encrypted image identifier 334 may be a different number of bits depending on the encryption algorithm used to generate it. As shown, the encrypted image identifier 334 is composed of bits (e.g., 0s and 1s). In some implementations, the encrypted image identifier 334 is made up of different values.

In FIG. 3A, the image encoding process 300 shows the image encoding system 206 applying an image identifier encoder 340. In particular, in one or more implementations, the image encoding system 206 encodes a single bit from the encrypted image identifier 334 into a single first singular value associated with a single DCT block. The image encoding system 206 may then encode another single bit (e.g., the next bit in the bit sequence) into the next first singular value associated with the next DCT block.

The image encoding system 206 may continue this process until the encrypted image identifier 334 is encoded into the generative image. Furthermore, the image encoding system 206 may continue this process until multiple instances of the encrypted image identifier 334 are encoded into the generative image. For example, with 128×128 DCT blocks (i.e., 16,384 total blocks), the image encoding system 206 can encode 136 copies or instances of a 120-bit encrypted image identifier into the generative image (fewer copies with larger DCT block sizes or a longer encrypted image identifier are used and more copies with a shorter encrypted image identifier).

In particular, the image identifier encoder 340 modifies or encodes the first singular value 326 from a first numeric value to a second or third numeric value based on the value of the selected bit from the encrypted image identifier 334. As shown, the first bit in the bit sequence of the encrypted image identifier 334 is selected. Based on the first bit having a value of 1 (i.e., true), the image encoding system 206 changes the numeric value from 100 to 105 (e.g., the second numeric value). If the selected bit of the encrypted image identifier 334 has a value of 0 (i.e., false), then the numeric value of 100 changes to 91 (e.g., the third numeric value).

In some implementations, the image identifier encoder 340 follows the following encoding formula to encode a bit into the first singular value:

$$S' = ([S/Q] + 0.25 + (0.5 \times \text{Bit})) \times Q$$

In the encoding formula, Q represents a quantization factor (e.g., 24, 28, or another value), Bit represents to a 0 or 1 from the next bit in the bit sequence of the encoded image identifier, S represents a singular value (e.g., the first singular value), [S/Q] represents a rounding down (e.g., [100/3]=3), and S' represents the modified first singular value. For example, for S=100, Q=28, and Bit=1, the singular value is encoded from 100 to 105 (e.g., [100/28]+0.25+(0.5×1)×28=105). If Bit=0, the singular value is encoded from 100 to 91 (e.g., [100/28]+0.25+(0.5×0)×28=91).

In various implementations, the image encoding system 206 applies one or more algorithms as part of the image identifier encoder 340 to change the numeric value from the first singular value 326 to an encoded first singular value 328. For example, the image identifier encoder 340 identifies the numeric value of the first singular element and whether the selected bit in the encrypted image identifier 334 is a 0 or 1 (or another value). Based on these values, the image identifier encoder 340 encodes the selected bit into the first singular value.

Upon encoding the encrypted image identifier 334 (e.g., the coded image identifier) into the singular values associated with different DCT blocks, the image encoding system 206 may reassemble or recompose the generative image with the encoded bits. As shown, the image encoding process 300 includes an inverse SVD 350 that converts the encoded SVD matrices to encoded shuffled DCT blocks, inverse shuffle elements 354 that unshuffles the shuffled and encoded DCT blocks into unshuffled and encoded DCT blocks based on the inverse of the shuffle pattern 314, an inverse DCT 356 that generates encoded wavelet coefficients from the shuffled and DCT blocks, and an inverse DWT 358 that generates the encoded generative image 360 from the encoded wavelet coefficients. In some implementations, the image encoding system 206 also recompiles the components of the generative image (e.g., the Y component from the YUV color space) as part of generating the encoded generative image 360.

As mentioned above, FIG. 3B provides additional details regarding the shuffle elements 312 included in FIG. 3A. In particular, FIG. 3B expands on the concepts introduced with the DCT blocks 310, the shuffle elements 312, and the shuffled DCT blocks 316 from FIG. 3A. For example, in many instances, implementing a shuffle element further protects an encoded image identifier against replacement attacks (where an encrypted message is moved from one image to another image to give the other image the appearance of authenticity). Indeed, shuffling the coefficient blocks can prevent bad or malicious actors from obtaining the correct singular values and/or the encrypted image identifier.

To elaborate, FIG. 3B includes the DCT blocks 310. As shown, a DCT block is four elements by four elements (e.g., 4 pixels per elements), or sixteen elements total (numbered 0-15 in FIG. 3B). As described above, in some implementations, a DCT block is another size.

As mentioned above, in various implementations, the image encoding system 206 applies a shuffle pattern 314 to a DCT block. The shuffle pattern 314 may be any combination that rearranges the elements or pixels in the DCT block into a different order or arrangement. While an example shuffle pattern is shown, the image encoding system 206 may implement other shuffle patterns. Furthermore, the image encoding system 206 may use the same shuffle pattern for all DCT blocks in an image. In some implementations, the image encoding system 206 uses the same shuffle pattern for all generative images generated within a period of time (e.g., 1 week, 1 month, 6 months, 1 year) because the shuffle pattern 314 could have one of a trillion different combinations.

Additionally, in various implementations, the image encoding system 206 removes an element or pixel before applying the shuffle pattern 314 to a DCT block. In some implementations, removing the first element further preserves the image quality as this element may include significant information about the generative image. In these cases, the image encoding system 206 may add the reserved element 318 back in during the unshuffling portion of the image encoding process. In various implementations, the image encoding system 206 removes one or more other bits of the DCT blocks.

As shown, the image encoding system 206 does not include the first element (e.g., the reserved element 318) as part of the shuffling process. As a result, as part of the shuffling process, the image encoding system 206 converts the four-by-four block or matrix into a three-by-five (or five-by-three) block or matrix, as shown. To illustrate, the shuffled DCT blocks 316 shows a three-by-five (e.g., 3×5) shuffled DCT block in a new configuration.

Figure 4A:
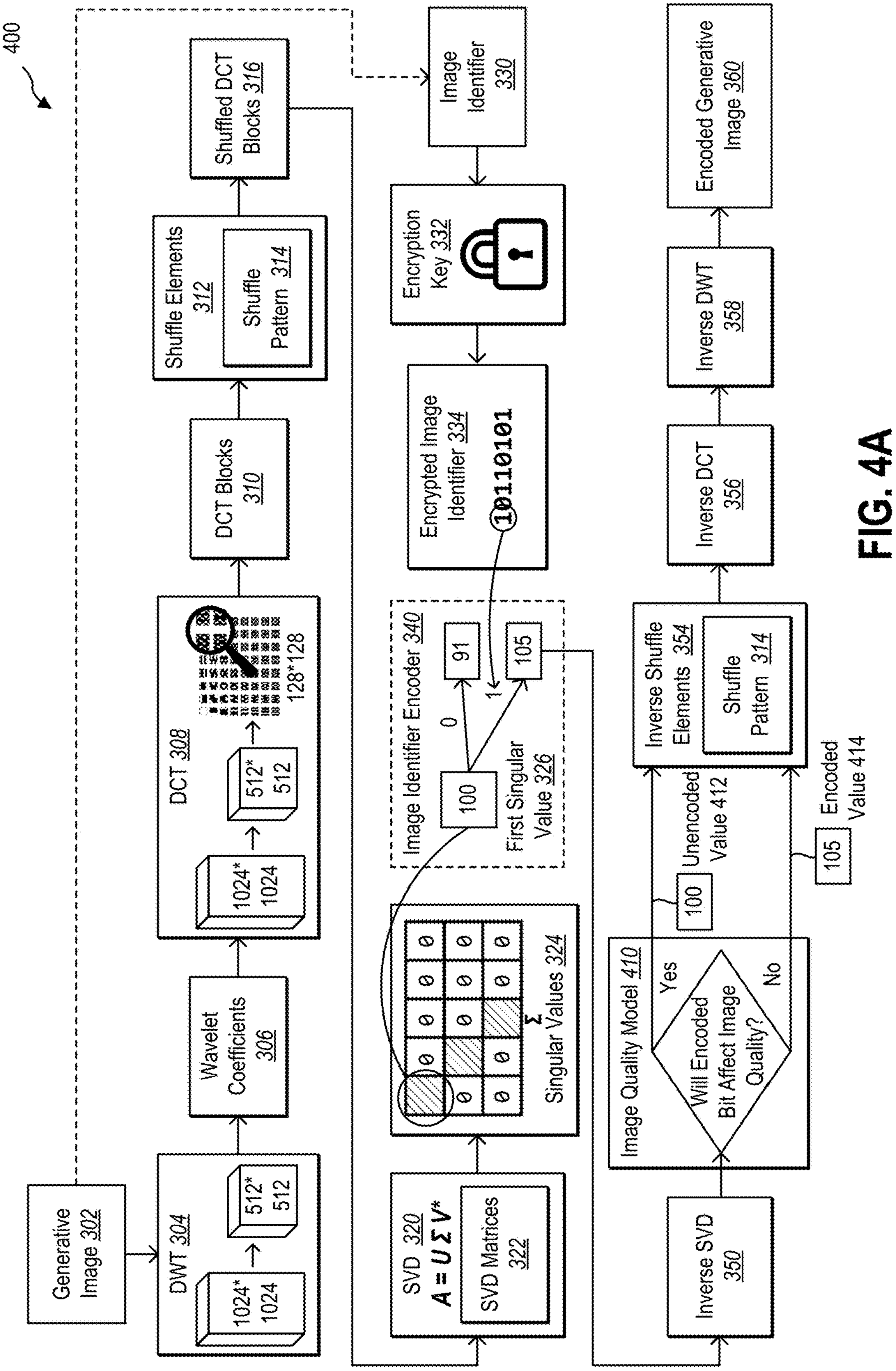
FIGS. 4A-4B illustrate additional example diagrams of encoding an image identifier into a generative image using an image quality model to selectively encode image elements.
Figure 4B:
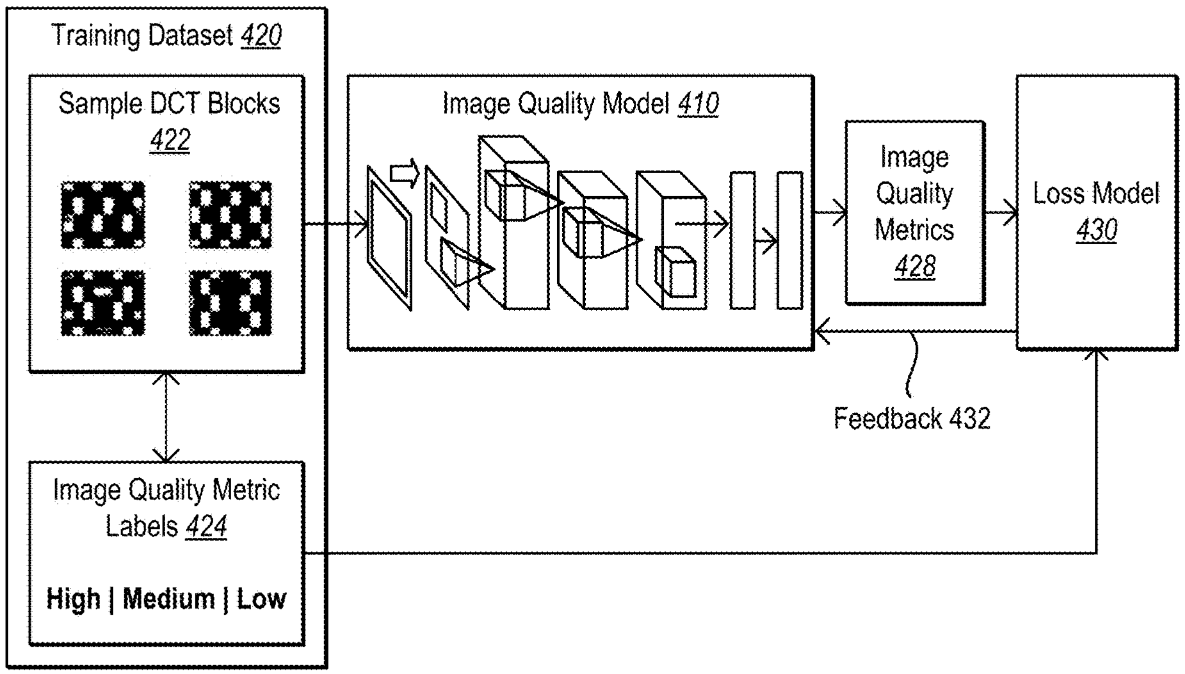

FIGS. 4A-4B further expand on the image encoding process described above. In particular, FIGS. 4A-4B illustrate additional example diagrams of encoding an image identifier into a generative image using an image quality model to selectively encode image elements according to some implementations. For instance, FIG. 4A adds an image quality component to the image encoding process using an image quality model while FIG. 4B provides details about generating the image quality model.

FIG. 4A includes another image encoding process 400 that includes many of the same components and actions as the image encoding process 300 provided in connection with FIG. 3A. Notably, FIG. 4A includes the image quality model 410 after the inverse SVD 350.

In various implementations, the image quality model 410 ensures that encoding a DCT block will not create a noticeable visual flaw in the encoded version of the generative image. Because encoding changes the composition of an image by modifying intrinsic features and elements, too much encoding will cause the image to look distorted, flawed, or include visible issues. Accordingly, the image quality model 410 determines if adding the encoded DCT block (the block can be shuffled or unshuffled depending on how the model is trained) would cause a visual blemish to the encoded generative image.

As shown, the image quality model 410 determines if the encoded bit will affect image quality. If the determination is yes, then the image encoding system 206 utilizes the encoded value 414 and the encoded (shuffled) DCT block in the encoded generative image 360. If the determination is no, then the image encoding system 206 utilizes the first singular value 326 with the unencoded value 412 and the (shuffled) DCT block in the encoded generative image 360. In this way, the image encoding system 206 can encode the generative image without degrading image quality. The image encoding system 206 may then advance to the next encoded DCT block with the next bit from the encrypted image identifier 334 being encoded into the next DCT block to determine if including that selected bit will negatively affect image quality.

As mentioned above, the image encoding system 206 may encode multiple copies or instances of the encrypted image identifier 334 into the encoded generative image 360. By including multiple copies of the encrypted image identifier 334 across the encoded generative image 360, when a selected bit is occasionally skipped from being encoded within the encoded generative image 360 to preserve image quality, the image encoding system 206 will still be able to extract the image identifier 330 from an encoded generative image. This process is further described below in connection with FIG. 5.

FIG. 4B provides additional details about image quality models. As shown, FIG. 4B includes the image quality model 410 for generating image quality metrics 428, a training dataset 420 with sample DCT blocks 422 and image quality metric labels 424, and a loss model 430.

As shown, the training dataset 420 includes the sample DCT blocks 422 and image quality metric labels 424 corresponding to the DCT blocks. For example, the image quality metric labels 424 provide labels indicating if a DCT block results in a high-quality image, a low-quality image, or somewhere in between. For example, the metric label ranges from 0 to 1 where 0 represents low-quality images (e.g., having obvious defective areas) and 1 represents high-quality images.

In some implementations, the sample DCT blocks 422 begin as normal images and are processed using the transform domain methods described above (e.g., DWT, DCT, and SVD), including being shuffled by a shuffle pattern. Furthermore, in some instances, the sample DCT blocks 422 are encoded. The sample DCT blocks are then evaluated and labeled for quality before being used to train the image quality model 410.

In one or more implementations, the image quality model 410 is a decision tree model or decision tree-based neural network. For instance, the image quality model 410 uses gradient boosting and builds a regression tree in a stepwise manner. In various implementations, the image quality model 410 is used for binary classification, linear regression, or other tasks. In one or more implementations, the image quality model 410 is another type of classification machine learning model or neural network.

As shown, the image quality model 410 is trained by providing the sample DCT blocks 422 to the image quality model 410 to generate image quality metrics 428 indicating if the input degrades image quality (or to what extent it degrades image quality). The image encoding system 206 then uses the loss model 430, which implements one or more loss functions, to determine an error amount based on a comparison to the image quality metric labels 424 corresponding to the input. In various instances, the error amount is provided to the image quality model 410 as feedback. In the case that the image quality model 410 is a stepwise decision tree, the loss model 430 can provide the feedback 432 at each step for the model to correct it in the next step.

As mentioned above, FIG. 5 provides additional details about decoding encoded generative images, including variations and derivatives of an encoded generative image. In particular, FIG. 5 illustrates an example diagram of decoding an image identifier from a generative image according to some implementations.

Figure 5:
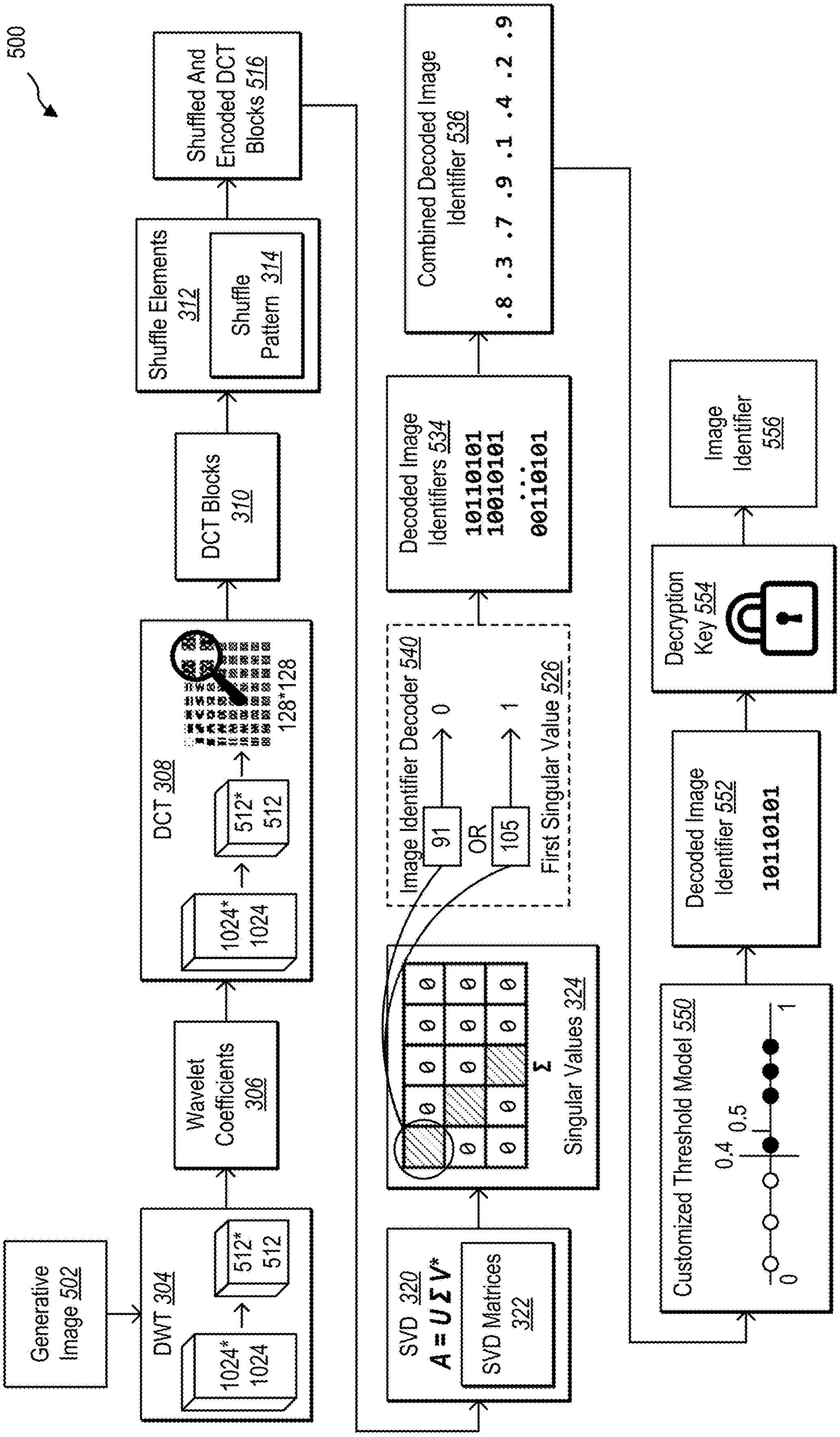
FIG. 5 illustrates an example diagram of decoding an image identifier from a generative image.

As shown, FIG. 5 includes an image decoding process 500 for decoding images with an image identifier. The image decoding process 500 begins with an encoded generative image 502. For instance, the encoded generative image 502 may be an original encoded generative image or an altered version (e.g., an attacked image). Examples of altered images include images that have been compressed, cropped, resized, blurred, sharpened, flipped, rotated, grayed, or noised.

As shown, the image decoding process 500 includes the generative image 302 using transform domain methods with the encoded generative image 502 to identify the intrinsic elements and features of the image where the encoded image identifier is stored. For example, the image encoding system 206 uses the DWT 304 to generate wavelet coefficients 306 and the DCT 308 to generate and partition DCT blocks 310 as described above. Additionally, as shown, the image encoding system 206 applies the shuffle elements 312 based on the shuffle pattern 314 to create shuffled and encoded DCT blocks 516, which are shuffled in the same configuration as the original encoded image.

In addition, as described above, the image encoding system 206 applies the SVD 320 to generate SVD matrices 322 and the multiple instances of the singular values 324 for the encoded generative image 502. From the singular values 324, the image encoding system 206 can extract the first singular value 526. Indeed, the image encoding system 206 can arrive at the singular values for each DCT block using similar processes as described above.

In various implementations, the image encoding system 206 uses an image identifier decoder 540 to decode a first singular value 526 from a second or third numerical value back to the first numeric value as well as extracts a bit value for the bit sequence of the coded image identifier. In some implementations, the image encoding system 206 uses an inverse algorithm to un-map or decode the first singular value 526 from the second or third numerical value back to the first numeric.

To elaborate, based on the current value of the first singular value 526 matching the second numeric value (e.g., 105), the image encoding system 206 determines that the bit value of the coded image identifier is 1 and that the first singular value 526 should be decoded to the first numeric value of 100. Similarly, if the current value of the first singular value 526 is 91, the image encoding system 206 determines that the bit value of the coded image identifier is 0 before decoding the first singular value 526 to the first numeric value of 100.

In some implementations, the image identifier decoder 540 follows the following decoding formula to decode a bit value from an encoded singular value:

$$\text{Bit} = \begin{cases} 1, & frac(S/Q) > 0.5 \\ 0, & frac(S/Q) \le 0.5 \end{cases}$$

Similar to the encoding formula, Q represents a quantization factor and S represents a singular value. Additionally, in the decoding formula, frac(x) represents a fractional part of the number x (e.g., frac(100/28)=0.5714).

In some implementations, the first singular value 526 does not exactly map to the second or third numerical value. In various implementations, the image encoding system 206 may choose the closer of the two numerical values. For example, if the encoded version of the first singular value 526 is closer to 105, then the bit value of the coded image identifier is 1. Otherwise, if the encoded version of the first singular value 526 is closer to 91, then the bit value of the coded image identifier is 0. In some cases, the image encoding system 206 may incorrectly decode the numeric value for the original first singular value and/or determine an incorrect value for the bit. However, as described next, the robustness of the image encoding system 206 accounts for these possibilities.

As shown, the image decoding process 500 includes decoded image identifiers 534. For example, the image encoding system 206 traverses through each of the shuffled and encoded DCT blocks 516 in the encoded generative image 502 to extract bits of the coded image identifier. Furthermore, the image encoding system 206 can extract several copies or instances of the encrypted image identifier from the intrinsic elements of the encoded generative image 502, shown as the decoded image identifiers 534.

In some instances, due to alterations made to an image, the encoded generative image 502 may be offset from the original generative image. In these instances, the image encoding system 206 may apply different offset approaches, such as experimenting with different offset values to identify when an encrypted image identifier begins. In some implementations, the image encoding system 206 may determine probabilities for various offsets (e.g., using a detection model) and try to decode the image identifier using several alignment offsets with the highest probabilities. Furthermore, the image encoding system 206 may recognize repetitive patterns within the set of the decoded image identifiers 534 and use the complete bit sequences (e.g., 120-bit sequences) to determine when a bit sequence is missing portions due to cropping or other alterations.

As mentioned above, in various implementations, the image encoding system 206 may decode multiple copies of the bit sequences for the decoded image identifiers 534. Additionally, some of these copies may differ due to image alterations, attacks, or skipped encoding (e.g., by the image quality model described above). Accordingly, in various implementations, the image encoding system 206 combines the decoded image identifiers 534 into a combined decoded image identifier 536.

In various implementations, the combined decoded image identifier 536 is of a float data type rather than a binary bit sequence. For example, the image encoding system 206 averages all the bits in the first position to determine its floating-point value and continues this process for each bit in the bit sequence. In some instances, the image encoding system 206 utilizes other combination approaches to determine the combined decoded image identifier 536, such as selecting the most common bit value for each position or the most common complete bit sequence (e.g., majority voting).

In implementations where the combined decoded image identifier 536 includes values other than 0 and 1 for each element, the image encoding system 206 may determine a coded bit sequence for the image identifier. For example, the image encoding system 206 uses traditional rounding to map floating-point values to binary values (e.g., 0.0-0.49 round down to 0 and 0.5-1.0 round up to 1).

In various implementations, the image encoding system 206 utilizes a customized threshold model 550 to determine a rounding threshold. For instance, the image encoding system 206 uses k-means clustering of all the 0 and 1 bits in the decoded image identifiers 534. Based on mapping all the 0 and 1 bits, the image encoding system 206 determines a threshold that maximizes the margin around the center of the 0 and 1 bits by iteratively finding centroids that minimize the total distance between data points and their respective cluster centroids.

To illustrate, in FIG. 5, the image decoding process 500 determines an updated threshold (e.g., an updated rounding threshold) of 0.4. Accordingly, in these cases, the image encoding system 206 rounds all floating-point values in the combined decoded image identifier 536 with a value of 0.0-0.39 down to zero and values of 0.4-1.0 up to 1.

As shown, the image decoding process 500 includes the image encoding system 206 determining or refining a decoded encrypted image identifier 552 based on applying the customized threshold model 550 (or using majority voting). The image encoding system 206 then decrypts the decoded encrypted image identifier 552 using the decryption key 554 (e.g., a corresponding public security key) to identify the image identifier 556 from the encoded generative image 502.

In some implementations, if no image identifier is decoded, the image encoding system 206 changes or flips each bit in the bit sequence (e.g., flip a 0 to 1 or a 1 to 0), independently, to identify a matching image identifier in the data store. In some implementations, the image encoding system 206 omits generating the combined decoded image identifier 536 and applying the customized threshold model 550 and provides each of the decoded image identifiers 534 to be decrypted.

By identifying the image identifier 556 from the encoded generative image 502, the image encoding system 206 can accurately trace a generative image to its origins. For example, the image identifier 556 connects to a datastore that indicates the generative AI image model that created the image, the requesting user identifier, the image prompt used, and other significant origin information. Furthermore, the image encoding system 206 can take appropriate actions, like preventing similar image prompts if the image prompt is determined to be harmful and/or unauthorized.

Figure 6:
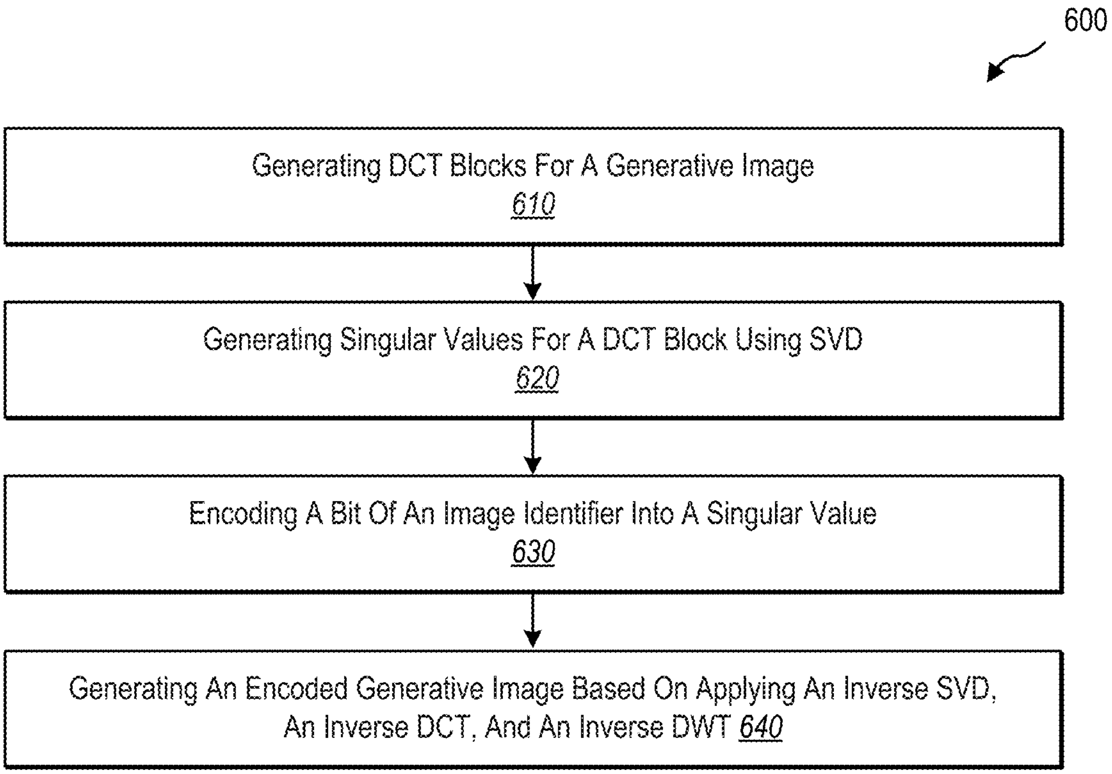
FIG. 6 illustrates an example series of acts of a computer-implemented method for encoding authenticity tokens into artificial intelligence (AI) generated content.

Turning now to FIG. 6, this figure illustrates an example series of acts of a computer-implemented method for encoding authenticity tokens into artificial intelligence (AI) generated content according to some implementations. While FIG. 6 illustrates acts according to one or more implementations, alternative implementations may omit, add to, reorder, and/or modify any of the acts shown.

The acts in FIG. 6 can be performed as part of a method (e.g., a computer-implemented method). Alternatively, a computer-readable medium can include instructions that, when executed by a processing system with a processor, cause a computing device to perform the acts in FIG. 6. In some implementations, a system (e.g., a processing system comprising a processor) can perform the acts in FIG. 6. For example, the system includes a processing system and a computer memory including instructions that, when executed by the processing system, cause the system to perform various actions or steps.

As shown, the series of acts 600 includes act 610 of generating DCT blocks for a generative image. For instance, in example implementations, act 610 involves generating discrete cosine transform (DCT) blocks for a generative image based on using discrete wavelet transform (DWT) and DCT. In various implementations, generating the DCT blocks includes generating wavelet coefficients for the generative image by applying the DWT to the generative image and generating the DCT blocks by partitioning the wavelet coefficients using the DCT.

In some implementations, in connection with act 610, generating the set of singular values for the first DCT block includes identifying a shuffle pattern for the first DCT block, shuffling pixels within the first DCT block into a new configuration based on the shuffle pattern, and using the new configuration of pixels with the SVD. In some implementations, the shuffle pattern removes a pixel from the first DCT block, applies the shuffle pattern to the remaining pixels of the first DCT block, and generates the new configuration of pixels by converting the remaining pixels of the first DCT block into an additional matrix for performing the SVD. In various implementations, the first DCT block is four elements by four elements and/or the additional matrix includes fifteen remaining elements of the first DCT block arranged into a three by five matrix.

As further shown, the series of acts 600 includes act 620 of generating singular values for a DCT block using SVD. For instance, in example implementations, act 620 involves generating a set of singular values for a first DCT block using singular value decomposition (SVD). In some implementations, in connection with act 620, the SVD is used to generate or transform the first DCT block into SVD matrices with a diagonal matrix that includes the set of singular values.

As further shown, the series of acts 600 includes act 630 of encoding a bit of an image identifier into a singular value. For instance, in example implementations, act 630 involves encoding a bit of an image identifier for the generative image into a first singular value of the set of singular values. In various implementations, the image identifier indicates origin information about the generative image. In some implementations, act 630 includes generating the image identifier in connection with generating the generative image and encoding the image identifier into a bit sequence. In some instances, the bit is part of the bit sequence. In some implementations, encoding the image identifier into the bit sequence includes encoding the image identifier with a private security key to generate the bit sequence (e.g., using a private security key to encode the image identifier and produce it).

In some implementations, in connection with act 630, encoding the bit of the image identifier into the first singular value includes identifying a first numeric value for the first singular value, modifying the first numeric value for the first singular value to a second numeric value based on the bit having a value of one, and modifying the first numeric value for the first singular value to a third numeric value based on the bit having a value of zero. In some implementations, the first numeric value, the second numeric value, and the third numeric value are different.

In some implementations, act 630 includes encoding individual or single bits of the bit sequence into different first singular values corresponding to different DCT blocks. In some instances, the bit sequence is included in the generative image up to 136 times when the generative image has an original pixel size of 1024 pixels by 1024 pixels. In some implementations, encoding the bit into the first singular value includes modifying the first singular value within the diagonal matrix without modifying other singular values of the set of singular values within the diagonal matrix.

As shown further, the series of acts 600 includes act 640 of generating an encoded generative image based on applying an inverse SVD, an inverse DCT, and an inverse DWT. For instance, in example implementations, act 640 involves generating an encoded generative image based on or by applying an inverse SVD, an inverse DCT, and an inverse DWT to the set of singular values with an encoded singular value. In some implementations, act 640 includes utilizing an image quality model to determine that encoding the bit into the first singular value of the set of singular values will result in a visible image alteration. In some implementations, the image quality model is trained to determine when encoding the bit into a singular value instance of a diagonal matrix associated with SVD matrices for a DCT block will result in a visible image alteration, and skipping encoding the bit into the singular value instance if the encoding results in a visible image alteration. In some implementations, the image quality model is a decision tree-based machine learning model trained based on DCT blocks generated from an inverted SVD process.

As mentioned above, in some implementations, the acts in the series of acts 600 are varied. For example, the series of acts 600 includes generating discrete cosine transform (DCT) blocks for a generative image based on using discrete wavelet transform (DWT) and DCT, and generating a set of singular values for each of the DCT blocks using singular value decomposition (SVD). In various implementations, the series of acts 600 also includes encoding single bits of an encrypted image identifier into each first singular value of each set of singular values associated with each of the DCT blocks, and generating an encoded generative image based on applying an inverse SVD, an inverse DCT, and an inverse DWT to each first set of singular values with an encoded first singular value.

In some implementations, the series of acts 600 includes additional acts. For example, the series of acts 600 includes decoding a version of the encoded generative image based on extracting multiple instances of a bit sequence from the encoded generative image, generating a combined bit sequence from the multiple instances of the bit sequence, and decrypting the combined bit sequence to identify the image identifier. In some implementations, the series of acts 600 includes identifying a digital image with unknown origins, decoding the digital image to identify the image identifier within the digital image, and determining the origin information of the digital image based on identifying the image identifier hidden within the digital image. In some implementations, the series of acts 600 also includes identifying a user identifier that generated the generative image after or upon identifying an image identifier decoded from the encoded generative image.

In some implementations, the series of acts 600 includes refining the combined bit sequence using k-means clustering to determine a dynamic threshold and applying the dynamic threshold to floating-point values within each bit in the combined bit sequence to generate a binary bit sequence. In some implementations, decoding the version of the encoded generative image includes applying a shuffle pattern between the DCT blocks and the SVD.

Figure 7:
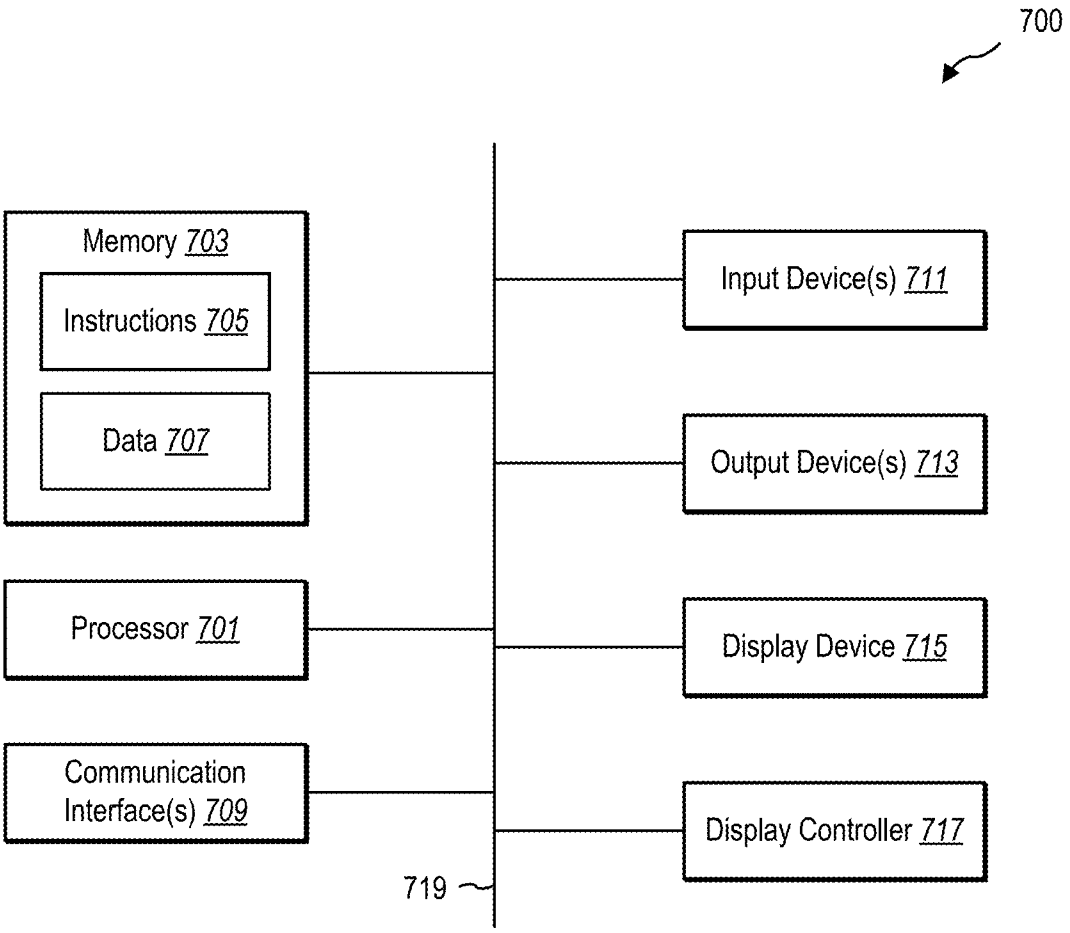
FIG. 7 illustrates example components included within a computer system that implements the image encoding system.

FIG. 7 illustrates certain components that may be included within a computer system 700. The computer system 700 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 700 represents one or more of the client devices, server devices, or other computing devices described above. For example, the computer system 700 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 700 includes a processing system including a processor 701. The processor 701 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 701 may be referred to as a central processing unit (CPU) and may cause computer-implemented instructions to be performed. Although the processor 701 shown is just a single processor in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during the execution of the instructions 705 by the processor 701.

A computer system 700 may also include one or more communication interface(s) 709 for communicating with other electronic devices. The one or more communication interface(s) 709 may be based on wired communication technology, wireless communication technology, or both. Some examples of the one or more communication interface(s) 709 include a Universal Serial Bus (USB), an Ethernet adapter, a wireless adapter that operates according to an Institute of Electrical and Electronics Engineers (IEEE) 702.11 wireless communication protocol, a Bluetooth® wireless communication adapter, and an infrared (IR) communication port.

A computer system 700 may also include one or more input device(s) 711 and one or more output device(s) 713. Some examples of the one or more input device(s) 711 include a keyboard, mouse, microphone, remote control device, button, joystick, trackball, touchpad, and light pen. Some examples of the one or more output device(s) 713 include a speaker and a printer. A specific type of output device that is typically included in a computer system 700 is a display device 715. The display device 715 used with implementations disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For clarity, the various buses are illustrated in FIG. 7 as a bus system 719.

This disclosure describes a subjective data application system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry required program code in the form of computer-executable instructions or data structures, which can be accessed by a general-purpose or special-purpose computer.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for encoding authenticity tokens into artificial intelligence (AI) generated content, comprising:
- generating discrete cosine transform (DCT) blocks for a generative image based on using discrete wavelet transform (DWT) and DCT;
- generating a set of singular values for a first DCT block using singular value decomposition (SVD);
- encoding a bit of an image identifier for the generative image into a first singular value of the set of singular values, wherein the image identifier indicates origin information about the generative image; and
- generating an encoded generative image based on applying an inverse SVD, an inverse DCT, and an inverse DWT to the set of singular values having an encoded singular value.

2. The computer-implemented method of claim 1, wherein generating the DCT blocks includes:
- generating wavelet coefficients for the generative image by applying the DWT to the generative image; and
- generating the DCT blocks by partitioning the wavelet coefficients using the DCT.

3. The computer-implemented method of claim 2, wherein generating the set of singular values for the first DCT block includes:

identifying a shuffle pattern for the first DCT block;

shuffling pixels within the first DCT block into a new configuration based on the shuffle pattern, and using the new configuration of pixels with the SVD.

4. The computer-implemented method of claim 3, wherein the shuffle pattern:

removes a pixel from the first DCT block;

applies the shuffle pattern to remaining pixels of the first DCT block; and generates the new configuration of pixels by converting remaining pixels of the first DCT block into an additional matrix for performing the SVD.

5. The computer-implemented method of claim 4, wherein:

the first DCT block is four elements by four elements; and the additional matrix includes fifteen remaining elements of the first DCT block arranged into a three by five matrix.

6. The computer-implemented method of claim 1, wherein encoding the bit of the image identifier into the first singular value includes:

identifying a first numeric value for the first singular value;

modifying the first numeric value for the first singular value to a second numeric value based on the bit having a value of one; and modifying the first numeric value for the first singular value to a third numeric value based on the bit having a value of zero, wherein the first numeric value, the second numeric value, and the third numeric value differ.

7. The computer-implemented method of claim 1, further comprising:

generating the image identifier in connection with generating the generative image; and encoding the image identifier into a bit sequence, wherein the bit is part of the bit sequence.

8. The computer-implemented method of claim 7, wherein encoding the image identifier into the bit sequence includes encoding the image identifier with a private security key to generate the bit sequence.

9. The computer-implemented method of claim 8, further comprising:

encoding single bits of the bit sequence into different first singular values corresponding to different DCT blocks, wherein the bit sequence is included in the generative image up to 136 times when the generative image has an original pixel size of 1024 pixels by 1024 pixels.

10. The computer-implemented method of claim 9, wherein:

using the SVD generates the first DCT block into SVD matrices with a diagonal matrix that includes the set of singular values; and encoding the bit into the first singular value includes modifying the first singular value within the diagonal matrix without modifying other singular values of the set of singular values within the diagonal matrix.

11. The computer-implemented method of claim 1, further comprising utilizing an image quality model to determine that encoding the bit into the first singular value of the set of singular values will result in a visible image alteration.

12. The computer-implemented method of claim 11, wherein:

the image quality model is trained to determine when encoding the bit into a singular value instance of a diagonal matrix associated with SVD matrices for a DCT block will result in a visible image alteration; and skipping encoding the bit into the singular value instance if the encoding results in a visible image alteration.

13. The computer-implemented method of claim 12, wherein the image quality model is a decision tree-based machine learning model trained based on DCT blocks generated from an inverted SVD process.

14. A computer-implemented method for encoding authenticity tokens into artificial intelligence (AI) generated content, comprising:

generating discrete cosine transform (DCT) blocks for a generative image based on using discrete wavelet transform (DWT) and DCT;

generating a set of singular values for each of the DCT blocks using singular value decomposition (SVD);

encoding single bits of an encrypted image identifier for the generative image into each first singular value of each set of singular values associated with each of the DCT blocks, wherein an image identifier of the encrypted image identifier indicates origin information about the generative image; and generating an encoded generative image based on applying an inverse SVD, an inverse DCT, and an inverse DWT to each first set of singular values with an encoded first singular value.

15. The computer-implemented method of claim 14, further comprising decoding a version of the encoded generative image based on:

extracting multiple instances of a bit sequence from the encoded generative image;

generating a combined bit sequence from the multiple instances of the bit sequence; and decrypting the combined bit sequence to identify the image identifier.

16. The computer-implemented method of claim 15, further comprising:

refining the combined bit sequence using k-means clustering to determine a dynamic threshold; and applying the dynamic threshold to floating-point values within each bit in the combined bit sequence to generate a binary bit sequence.

17. The computer-implemented method of claim 15, wherein:

decoding the version of the encoded generative image includes applying a shuffle pattern between the DCT blocks and the SVD; and the shuffle pattern was used to encode the generative image.

18. The computer-implemented method of claim 14, further comprising:

identifying a digital image with unknown origins;

decoding the digital image to identify the image identifier within the digital image; and determining the origin information of the digital image based on identifying the image identifier hidden within the digital image.

19. The computer-implemented method of claim 18, further comprising identifying a user identifier requesting the generative image be generated based on the image identifier.

20. A system, comprising:

a processing system; and a computer memory comprising instructions that, when executed by the processing system, cause the system to perform operations of:

generating discrete cosine transform (DCT) blocks for a generative image based on using discrete wavelet transform (DWT) and DCT;

generating a set of singular values for a first DCT block using singular value decomposition (SVD);

encoding a bit of an image identifier for the generative image into a first singular value of the set of singular values, wherein the image identifier indicates origin information about the generative image; and generating an encoded generative image based on applying an inverse SVD, an inverse DCT, and an inverse DWT to the set of singular values having an encoded singular value.

* * * * *